US008687391B2

(12) United States Patent
Oedegard et al.

(10) Patent No.: US 8,687,391 B2
(45) Date of Patent: Apr. 1, 2014

(54) CONVERTER SYSTEM AND METHOD FOR THE OPERATION OF SUCH A CONVERTER

(71) Applicant: ABB Technology AG, Zürich (CH)

(72) Inventors: Bjoern Oedegard, Turgi (CH); Christoph Schaub, Baden (CH); Claes Hillberg, Möhlin (CH); Steve Aubert, Wallisellen (CH)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/749,076

(22) Filed: Jan. 24, 2013

(65) Prior Publication Data

US 2013/0135908 A1 May 30, 2013

Related U.S. Application Data

(63) Continuation of application No. PCT/EP2011/061482, filed on Jul. 7, 2011.

(30) Foreign Application Priority Data

Jul. 27, 2010 (EP) .................................. 10170860

(51) Int. Cl.
*H02M 7/77* (2006.01)
(52) U.S. Cl.
USPC ............................................ 363/57; 307/100
(58) Field of Classification Search
USPC .................. 363/57, 58, 43; 307/100, 105
See application file for complete search history.

(56) References Cited

U.S. PATENT DOCUMENTS

| 7,388,765 | B2* | 6/2008 | Kaulio ............................ 363/37 |
| 2005/0116476 | A1 | 6/2005 | Feddersen |
| 2005/0237678 | A1 | 10/2005 | Virtanen |
| 2005/0281065 | A1 | 12/2005 | Nojima |
| 2007/0291426 | A1 | 12/2007 | Kasunich et al. |

FOREIGN PATENT DOCUMENTS

| EP | 0970840 A2 | 1/2000 |
| EP | 1780856 A2 | 5/2007 |
| WO | WO 03/065567 A1 | 8/2003 |
| WO | WO 2004/091085 A1 | 10/2004 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) dated Feb. 7, 2013, issued in corresponding International Application No. PCT/EP2011/061482. (7 pages).

(Continued)

*Primary Examiner* — Harry Behm
*Assistant Examiner* — Matthew Grubb
(74) *Attorney, Agent, or Firm* — Buchanan Ingersoll & Rooney PC

(57) ABSTRACT

A converter system is provided for the switching of at least three voltage levels and for the switching of two voltage levels. A method is also provided for the operation of a converter system for the switching of at least three voltage levels and for the operation of a converter system for the switching of two voltage levels.

9 Claims, 5 Drawing Sheets

(56) References Cited

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA 237) dated Feb. 7, 2013, issued in corresponding International Application No. PCT/EP2011/061482. (8 pages).
International Search Report (PCT/ISA/210) issued on Feb. 16, 2012, by the European Patent Office as the International Searching Authority for International Application No. PCT/EP2011/061482.
Written Opinion (PCT/ISA/237) issued on Feb. 16, 2012, by the European Patent Office as the International Searching Authority for International Application No. PCT/EP2011/061482.
European Search Report issued on Mar. 4, 2011 for European Application No. 10170860.0.
Jesus Lopez et al., Ride Through of Wind Turbines with Doubly Fed Induction Generator Under Symmetrical Voltage Dips, IEEE Transactions on Industrial Electronics, vol. 56, No. 10, Oct. 2009, pp. 4246-4254.

* cited by examiner

CONVERTER SYSTEM AND METHOD FOR THE OPERATION OF SUCH A CONVERTER

RELATED APPLICATIONS

This application claims priority as a continuation application under 35 U.S.C. §120 to PCT/EP2011/061482, which was filed as an International Application on Jul. 7, 2011 designating the U.S., and which claims priority to European Application 10170860.0 filed in Europe on Jul. 27, 2010. The entire contents of these applications are hereby incorporated by reference in their entireties.

FIELD

The present disclosure relates to the field of power electronics. More particularly, the present disclosure relates to a converter system for the switching of at least three voltage levels, to a converter system for the switching of at least two voltage levels, and to a method for the operation of such converter systems.

BACKGROUND INFORMATION

Converter systems are used in a wide variety of applications. A converter system generally includes a converter unit. The DC side of the converter unit is connected to a DC circuit. The AC side of the converter unit is generally arranged for connection to an AC electricity system and/or an electrical load, such as a rotating electric machine or a transformer, whereby the connection of any electrical load is conceivable. Depending upon the application concerned, the connection of a shorting circuit on the AC side is also customary. A converter system of the above-mentioned type, with a shorting circuit, is disclosed, for example, in US 2005/0281065 A1 and in US 2007/0291426 A1. If the current-carrying capacity of the converter unit is exceeded, the switches in the shorting circuit will close, and the AC side of the converter unit is short-circuited by means of a shorting resistor in the shorting circuit.

Given the simultaneous combination of requirements for a high current-carrying capacity with low component costs, the use of thyristors as switches in the shorting circuit, as disclosed, for example, in US 2007/0291426 A1, is a rational option. However, thyristors cannot be actively tripped or turned off. The turn-off of a thyristor is only possible upon the zero crossing of the current to be carried, thereby necessitating the use of additional and expensive "turn-off circuits".

In addition to their application in rotating frequency converters, electrical loads in the form of double-fed asynchronous machines are increasingly used in variable-speed pumped storage power plants. In many locations, the "unbundling" of electricity generation and transmission functions is, or has been associated with the introduction of a Grid Code, in which the relevant conditions for connection to the electricity supply system are/have been defined. In some cases, new and more stringent conditions are to be fulfilled in response to system disturbances, specifically voltage dips. During transient voltage dips, it is intended that connected power plants and frequency-conversion installations should remain connected to the electricity supply system and, in some cases, will deliver an active voltage-stabilization function. This is achieved by the controlled in-feed of reactive current, in accordance with the provisions of the relevant Grid Code. In case of voltage dips, converter units for the supply of alternating current to the rotor windings of double-fed asynchronous machines will be temporarily exposed to a current which exceeds the normal service current. In order to protect the converter unit against overloading and, at the same time, to restrict the rotor voltage to an acceptable level for the rotor of the machine concerned, the above-mentioned shorting circuits are provided with a plurality of thyristors. Shorting circuits of this type provide reliable protection for the converter unit and its associated machine by short-circuiting the rotor winding in case of a fault. However, where shorting circuits with thyristors of this type are used, the immediate restoration of normal service—regulated by the converter unit—the current is reduced to an acceptable value which cannot be achieved within a short space of time.

Further generic instances of known techniques are disclosed in "Ride through of Wind Turbines with doubly fed Induction Generator under symmetrical Voltage Dips", IEEE Transactions on Industrial Electronics, 2009, in WO 2004/091085 A1, in WO 03/065567 A1, in EP 0970840 A2 and in EP 1780856 A2.

SUMMARY

An exemplary embodiment of the present disclosure provides a converter system for the switching of least three voltage levels. The exemplary converter system includes a converter unit having a DC side and an AC side. The DC side of the converter unit is connected to a DC circuit having a voltage zero point, and the AC side of the converter unit is connected to a shorting circuit having a plurality of thyristors and at least two shorting resistors. The converter unit is configured to monitor current carried by the converter unit in relation to a threshold value and, when the threshold value is exceeded, to actuate the thyristors by the application of a closing signal, such that the AC side of the converter unit is connected to the at least two shorting resistors. The exemplary converter system also includes a voltage-limiting device connected to the DC circuit and the at least two shorting resistors. The voltage-limiting device is configured to restrict any overvoltage on the DC circuit and to turn-off the thyristors. When the threshold value is no longer exceeded, the converter unit is configured to switch the AC side of the converter unit to the voltage zero point of the DC circuit and terminate application of the closing signal. The voltage-limiting device is configured to connect the at least two shorting resistors to the DC circuit for a configurable time interval, whereafter the converter unit is configured to isolate the AC side of the converter unit from the voltage zero point of the DC circuit once more.

An exemplary embodiment of the present disclosure provides a converter system for the switching of two voltage levels. The exemplary converter system includes a converter unit having a DC side and an AC side. The DC side of the converter unit is connected to a DC circuit, and the AC side of the converter unit is connected to a shorting circuit having a plurality of thyristors and a shorting resistor. The converter unit is configured to monitor the current carried by the converter unit in relation to a threshold value and, when the threshold value is exceeded, to actuate the thyristors by the application of a closing signal, such that the AC side of the converter unit is connected to the shorting resistor. The exemplary converter system also includes a voltage-limiting device connected to the DC circuit and to the shorting resistor. The voltage-limiting device is configured to restrict overvoltage on the DC circuit and to turn-off of the thyristors. When the threshold value is no longer exceeded, the converter unit is configured to switch the AC side of the converter unit to a negative or positive voltage point of the DC circuit and terminate application of the closing signal. The voltage-limiting device is configured to connect the shorting resistor to the DC circuit for a configurable time interval, whereafter the converter unit is configured to isolate the AC side of the converter unit from the positive or negative voltage point of the DC circuit once more.

An exemplary embodiment of the present disclosure provides a method for the operation of a converter system for the switching of at least three voltage levels. The converter system includes a converter unit having a DC side and an AC side. The DC side of the converter unit is connected to a DC circuit having a voltage zero point, and the AC side of the converter unit is connected to a shorting circuit having a plurality of thyristors and at least two shorting resistors. The exemplary method includes monitoring current carried by the converter unit in relation to a threshold value, and, when the threshold value is exceeded, actuating the thyristors by the application of a closing signal, such that the AC side of the converter unit is connected to the at least two shorting resistors. The exemplary method also includes restricting, in a voltage-limiting device connected to the DC circuit and to the at least two shorting resistors, any overvoltage on the DC circuit. In addition, the exemplary method includes switching in the converter unit the AC side of the converter unit to the voltage zero point, when the threshold value is no longer exceeded, and terminating application of the closing signal. The exemplary method also includes connecting, in the voltage-limiting device, the at least two shorting resistors to the DC circuit for a configurable time interval. Furthermore, the exemplary method includes, after the configurable time interval, the converter unit isolating the AC side of the converter unit from the voltage zero point of the DC circuit once more.

An exemplary embodiment of the present disclosure provides a method for the operation of a converter system for the switching of two voltage levels. The converter system includes a converter unit having a DC side and an AC side. The DC side of the converter unit is connected to a DC circuit, and the AC side of the converter unit is connected to a shorting circuit having a plurality of thyristors and a shorting resistor. The exemplary method includes monitoring current carried by the converter unit in relation to a threshold value, and, when the threshold value is exceeded, actuating the thyristors by the application of a closing signal, such that the AC side of the converter unit is connected to the shorting resistor. The exemplary method also includes restricting, in a voltage-limiting device connected to the DC circuit and to the shorting resistor, any overvoltage on the DC circuit. In addition, the exemplary method includes switching, in the converter unit, the AC side of the converter unit to a negative or positive voltage point of the DC circuit, when the threshold value is no longer exceeded, and terminating application of the closing signal. In addition, the exemplary method includes connecting, in the voltage-limiting device, the shorting resistor to the DC circuit for a configurable time interval. Furthermore, the exemplary method includes, after the configurable time interval, the converter unit isolating the AC side of the converter unit from the negative or positive voltage point of the DC circuit once more.

BRIEF DESCRIPTION OF THE DRAWINGS

Additional refinements, advantages and features of the present disclosure are described in more detail below with reference to exemplary embodiments illustrated in the drawings, in which.

Figure 1:
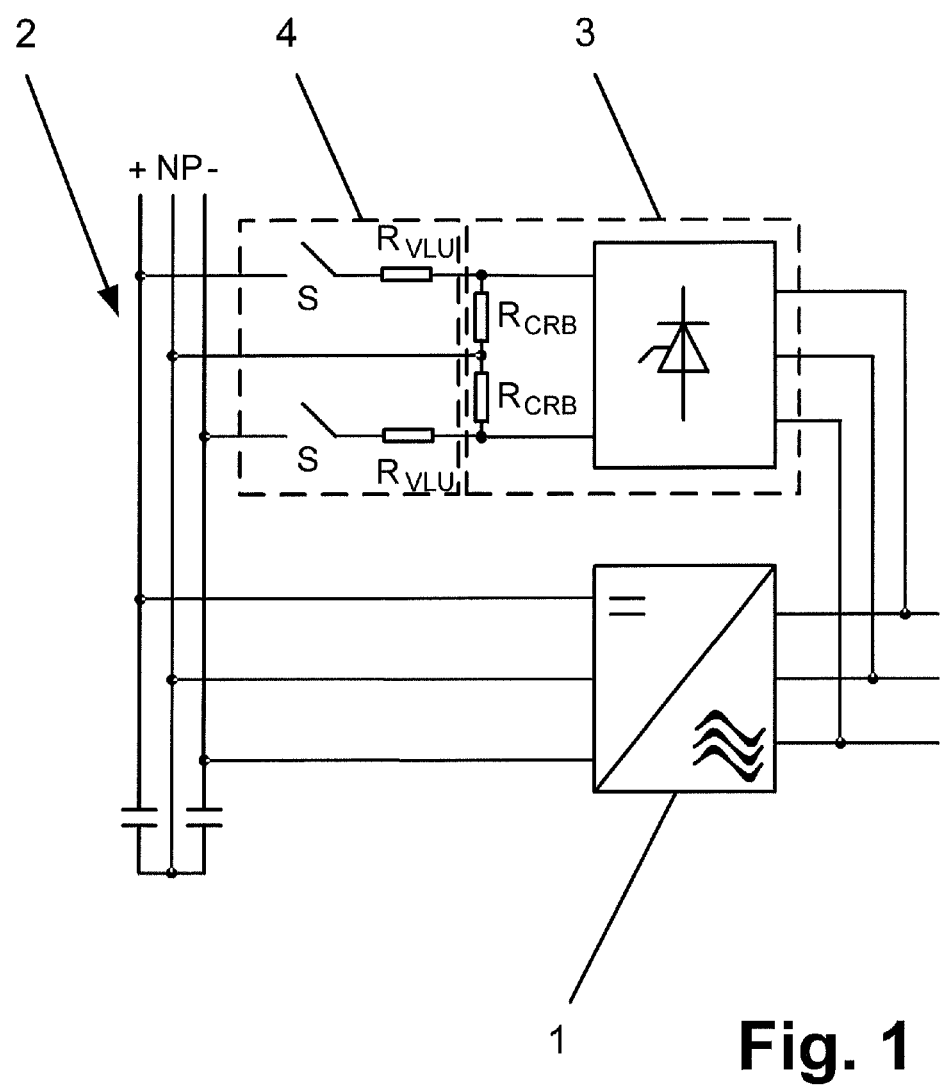
FIG. 1 shows a first form of an exemplary embodiment of a converter system according to the present disclosure.

The reference symbols used in the diagrams, with their associated meanings, are summarized in the list of reference symbols. In principle, equivalent components in the diagrams are marked with the same reference symbols. The forms of embodiment described are presented as examples of the subject matter of the present disclosure, and are not to be considered by way of limitation.

DETAILED DESCRIPTION

Exemplary embodiments of the present disclosure provide a converter system with a thyristor-controlled shorting circuit which represents a further development of known techniques, wherein an exceptionally straightforward arrangement for the turn-off of thyristors in the shorting circuit is provided, and the system is of exceptionally simple construction. Exemplary embodiments of the present disclosure also provide a method for the exceptionally straightforward operation of the converter system, and for the problem-free, rapid and reliable turn-off of thyristors in the shorting circuit.

Exemplary embodiments of the present disclosure provide a converter system for the switching of at least three voltage levels and for the switching of two voltage levels. Exemplary embodiments of the present disclosure also provide a method for the operation of a converter system for the switching of at least three voltage levels and for the operation of a converter system for the switching of two voltage levels. Additional features of the present disclosure will be described in more detail below with respect to exemplary embodiments illustrated in the drawings.

A converter system for the switching of at least three voltage levels includes a converter unit having a DC side and an AC side. The DC side of the converter unit is connected to a DC circuit, which is provided with a voltage zero point. The AC side of the converter unit is connected to a shorting circuit, which is provided with a plurality of thyristors and at least two shorting resistors. The current carried by the converter unit is monitored in relation to a threshold value and, when this threshold value is exceeded, the thyristors are actuated by the application of a closing signal, such that the AC side of the converter unit is connected to the at least two shorting resistors. According to an exemplary embodiment of the present disclosure, a voltage-limiting device for the restriction of any overvoltage on the DC circuit is connected to the DC circuit, whereby the voltage-limiting device is connected to the at least two shorting resistors. When the threshold value is no longer exceeded, the converter unit switches the AC side of the converter unit to the voltage zero point of the DC circuit and the closing signal is no longer applied. The voltage-limiting device connects the at least two shorting resistors to the DC circuit for a configurable time interval, whereafter the converter unit isolates the AC side of the converter unit from the voltage zero point of the DC circuit once more.

In a converter system for the switching of two voltage levels according to an exemplary embodiment of the present disclosure, the converter system includes a converter unit having a DC side and an AC side. The DC side of the converter unit is connected to a DC circuit, and the AC side of the converter unit is connected to a shorting circuit, wherein the shorting circuit is provided with a plurality of thyristors and one shorting resistor. The current carried by the converter unit is monitored in relation to a threshold value and, when this threshold value is exceeded, the thyristors are actuated by the application of a closing signal, such that the AC side of the converter unit is connected to the shorting resistor. According to an exemplary embodiment of the present disclosure, a voltage-limiting device for the restriction of any overvoltage on the DC circuit is connected to the DC circuit, whereby the voltage-limiting device is connected to the shorting resistor. When the threshold value is no longer exceeded, the converter unit switches the AC side of the converter unit to the negative or positive voltage point of the DC circuit and the closing signal is no longer applied. The voltage-limiting device connects the shorting resistor to the DC circuit for a configurable time interval, whereafter the converter unit isolates the AC side of the converter unit from the negative or positive voltage point of the DC circuit once more.

The converter system for the switching of at least three voltage levels or for the switching of two voltage levels is therefore of an exceptionally simple, and correspondingly robust construction. Where the thyristors in the shorting circuit are turned on, for example, in response to an overcurrent, the voltage-limiting device provides an advantageous means for the problem-free, rapid and reliable turn-off of the thyristors.

In accordance with an exemplary embodiment of the method according to the present disclosure for the operation of a converter system for the switching of at least three voltage levels, the DC side of the converter unit in the converter system is connected to a DC circuit which is provided with a voltage zero point, and the above-mentioned shorting circuit is connected to the AC side of the converter unit, whereby the shorting circuit, in addition to the plurality of thyristors, is provided with at least two shorting resistors. According to an exemplary embodiment of the method, the current carried by the converter unit is monitored in relation to a threshold value and, when this threshold value is exceeded, the thyristors are then actuated by the application of a closing signal, such that the AC side of the converter unit is connected to the at least two shorting resistors. The at least two shorting resistors will then assume the take-up of current, until such time as the current falls back below the threshold value. According to an exemplary embodiment of the present disclosure, the above-mentioned voltage-limiting device for the restriction of any overvoltage on the DC circuit is connected to the DC circuit and also to the at least two shorting resistors such that, when the threshold value is no longer exceeded, the converter unit switches the AC side of the converter unit to the voltage zero point of the DC circuit, and the closing signal is no longer applied, whereby the current, which now lies below the threshold value, is advantageously switched to the converter unit. Moreover, the voltage-limiting device then connects the at least two shorting resistors to the DC circuit for a configurable time interval. Accordingly, a back-e.m.f. is generated in the at least two shorting resistors, which effects the straightforward, rapid and secure turn-off of the thyristors. Accordingly, the voltage-limiting device functions advantageously as a thyristor switch-off device. Thereafter, the converter unit isolates the AC side of the converter unit from the voltage zero point of the DC circuit once more, thereby permitting the converter system to resume normal operation.

In a converter system for the switching of two voltage levels, the DC circuit is connected on the DC side and the shorting circuit is connected on the AC side, whereby the shorting circuit is provided with a plurality of thyristors and one shorting resistor. In a converter system of this type for the switching of two voltage levels, according to an exemplary embodiment of the disclosed method, the current carried by the converter unit is also monitored in relation to a threshold value and, when this threshold value is exceeded, the thyristors are actuated by the application of a closing signal, such that the AC side of the converter unit is connected to the shorting resistor. The shorting resistor will then assume the take-up of any overcurrent, until such time as the threshold value is no longer exceeded. According to an exemplary embodiment of the present disclosure, the above-mentioned voltage-limiting device for the restriction of any overvoltage on the DC circuit is connected to the DC circuit and also to the shorting resistor such that, when the threshold value is no longer exceeded, the converter unit switches the AC side of the converter unit to the negative or positive voltage point of the DC circuit, and the closing signal is no longer applied, thereby allowing the current to be advantageously switched to the converter unit. Moreover, the voltage-limiting device connects the shorting resistor to the DC circuit for a configurable time interval. Accordingly, a back-e.m.f. is generated in the shorting resistor, which advantageously affects the straightforward, rapid and secure turn-off of the thyristors. Accordingly, in this converter circuit arrangement, the voltage-limiting device also functions advantageously as a thyristor switch-off device. Thereafter, the converter unit isolates the AC side of the converter unit from the negative or positive voltage point of the DC circuit once more.

Overall, the method according to the present disclosure therefore permits the exceptionally problem-free, rapid and specifically secure turn-off of thyristors in the shorting circuit, thereby permitting the exceptionally straightforward operation of the converter system.

These and further objects, advantages and characteristics of the present disclosure, are clarified by the following detailed description of exemplary forms of embodiment of the present disclosure, with reference to the attached drawings.

Forms of Exemplary Embodiments of the Present Disclosure

Figure 4:
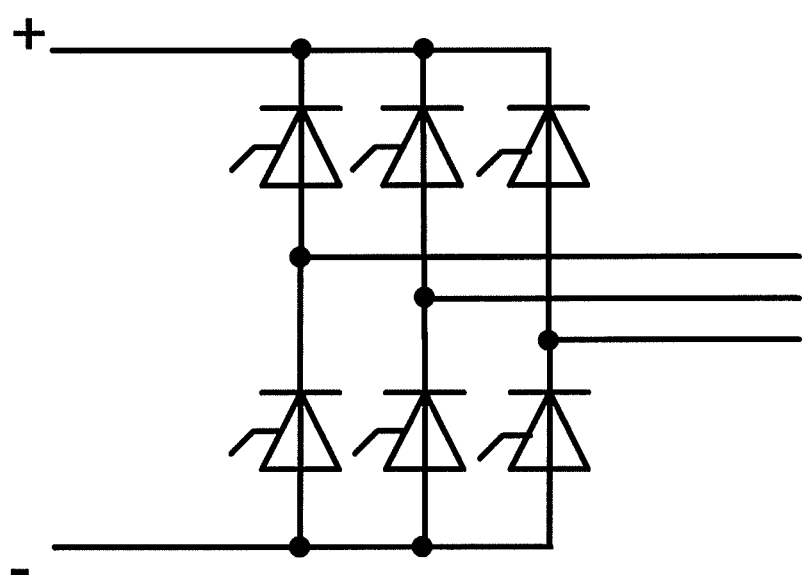
FIG. 4 shows one form of an exemplary embodiment of a thyristor circuit in a shorting circuit of the converter system according to the present disclosure.

FIG. 1 shows a first form of an exemplary embodiment of a converter system according to the present disclosure, for the switching of three voltage levels. The converter system according to the present disclosure for the switching of generally at least three voltage levels includes a converter unit 1 having a DC side and an AC side. The DC side of the converter unit is connected to a DC circuit 2, and the AC side of the converter unit is connected to a shorting circuit 3. The DC circuit 2 is provided with a voltage zero point NP, and the shorting circuit 3 is provided with a plurality of thyristors and at least two shorting resistors $R_{CRB}$. FIG. 4 shows an exemplary form of an embodiment of a thyristor circuit in the shorting circuit 3. According to an exemplary embodiment of the present disclosure, a voltage-limiting device 4 for the restriction of an overvoltage on the DC circuit 2 is connected to the DC circuit 2, whereby the voltage-limiting device 4 is connected to the at least two shorting resistors $R_{CRB}$. In accordance with an exemplary embodiment, the function of the voltage-limiting device 4 is the restriction and reduction of overvoltages on the DC circuit 2. To this end, only the controllable power switch S is closed, such that a current flows in the limiting resistors $R_{VLU}$ and in the shorting resistors $R_{CRB}$, thereby limiting and reducing the overvoltage on the DC circuit 2. If the thyristors in the shorting circuit 3 are actuated, for example, in response to an overcurrent, the voltage-limiting device 4 also provides an advantageous means for the problem-free, rapid and reliable turn-off of the thyristors. The relevant method according to the present disclosure for the operation of the converter system according to the present disclosure, as represented in FIG. 1, together with the associated deployment of the voltage-limiting device 4, are described in greater detail below.

In the converter system for the switching of three voltage levels, as represented in the exemplary embodiment of FIG. 1, the voltage-limiting device 4 may be provided with two series circuits, each including a limiting resistor $R_{VLU}$ and a controllable power switch S. A controllable mechanical switch or a controllable semiconductor power switch are conceivable options for the controllable power switch S, whereby the controllable semiconductor power switch may be configured, for example, as a gate turn-off thyristor (GTO), as an integrated gate commutated thyristor (IGCT), as a power MOSFET, or as an insulated-gate bipolar transistor (IGBT). As shown in FIG. 1, the DC circuit 2 includes two series-connected capacitive energy storage devices, wherein the interconnection point of the two capacitive energy storage devices forms a voltage zero point NP. As shown in FIG. 1, the shorting circuit 3 is provided with two shorting resistors $R_{CRB}$, whereby each series circuit includes the limiting resistor $R_{VLU}$ and the controllable power switch S is connected to one of the shorting resistors $R_{CRB}$, respectively. In accordance with an exemplary embodiment, the shorting resistors $R_{CRB}$ are interconnected. As shown in FIG. 1, the interconnection point of the two shorting resistors $R_{CRB}$ is specifically connected to the voltage zero point NP of the DC circuit 2. Overall, the converter system for the switching of three voltage levels is therefore of exceptionally simple, and correspondingly robust construction.

Figure 5:
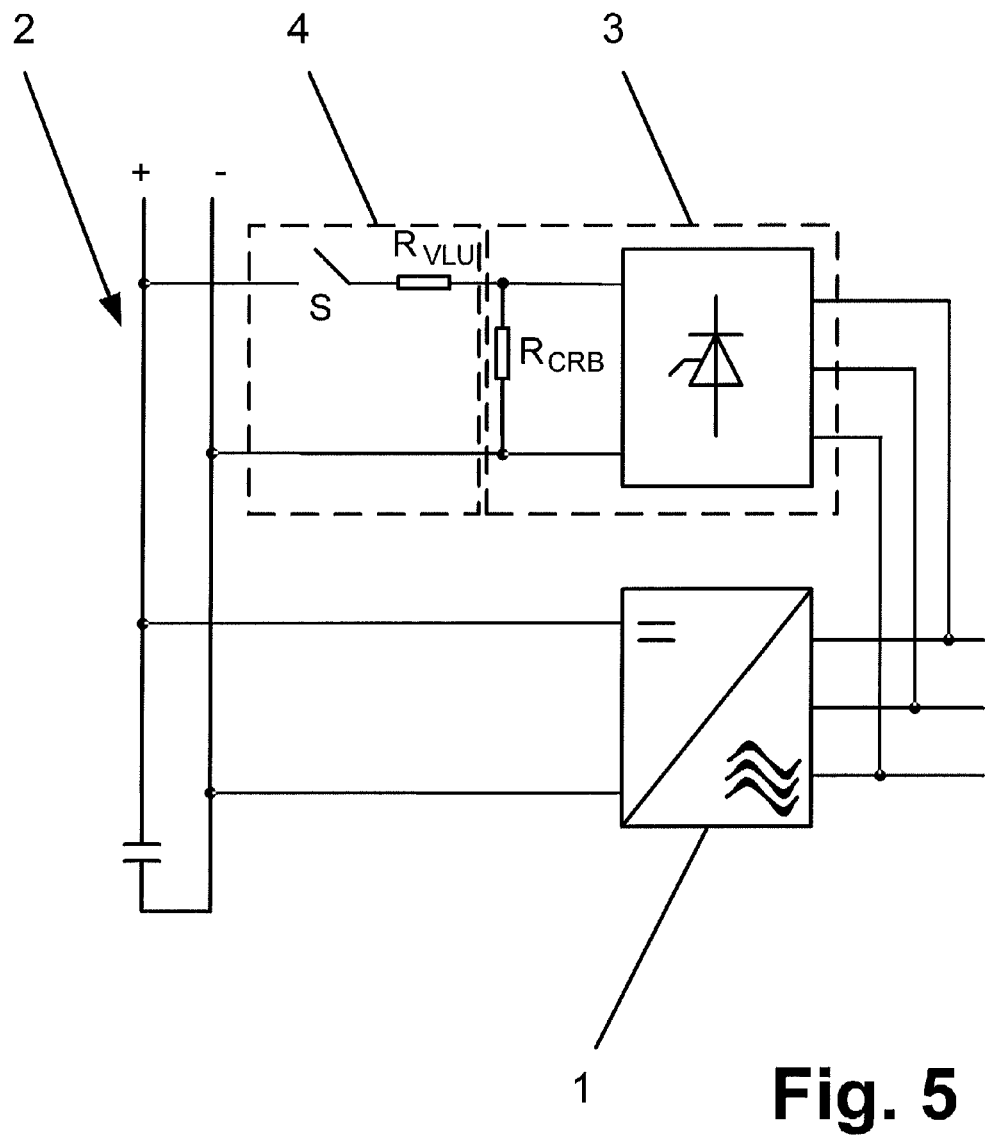
FIG. 5 shows a second form of an exemplary embodiment of a converter system according to the present disclosure.

FIG. 5 shows a second form of an exemplary embodiment of the converter system according to the present disclosure, in this case a converter system for the switching of two voltage levels. As shown in FIG. 5, the voltage-limiting device 4 is provided with a single series circuit including the limiting resistor $R_{VLU}$ and the controllable power switch S, whereby the series circuit includes the limiting resistor $R_{VLU}$, and the controllable power switch S is connected to the shorting resistor $R_{CRB}$. As shown in FIG. 5, the DC circuit 2 includes a capacitive energy storage device. In accordance with an exemplary embodiment, the voltage-limiting device 4 in FIG. 5 can also restrict and reduce overvoltages on the DC circuit 2. To this end, only the controllable power switch S is closed, such that a current flows in the limiting resistor $R_{VLU}$ and in the shorting resistor $R_{CRB}$, thereby limiting and reducing the overvoltage on the DC circuit 2. Overall, the construction of the converter system for the switching of two voltage levels as shown in FIG. 5 is extremely simple and, accordingly, is exceptionally robust. If the thyristors in the shorting circuit 3 are actuated, for example, in response to an overcurrent, the voltage-limiting device 4 also provides an advantageous means for the problem-free, rapid and reliable turn-off of the thyristors. The relevant method according to the present disclosure for the operation of the converter system according to the present disclosure, as represented in FIG. 5, together with the associated deployment of the voltage-limiting device 4, are described in greater detail below.

Figure 2:
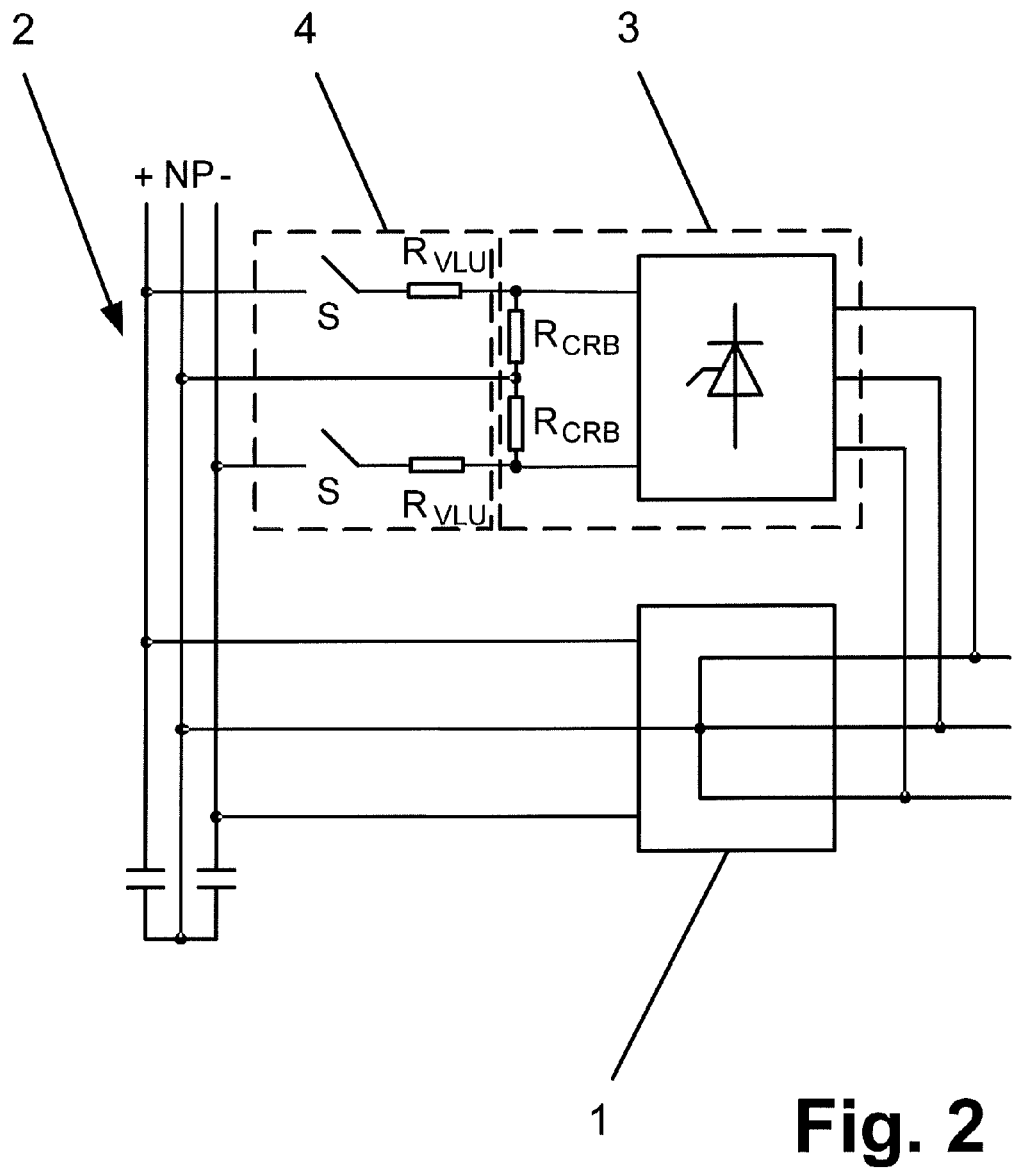
FIG. 2 shows the first form of the embodiment of the converter system represented in FIG. 1 in an operating state which is in accordance with an exemplary method according to the present disclosure for the operation of the converter system.
Figure 3:
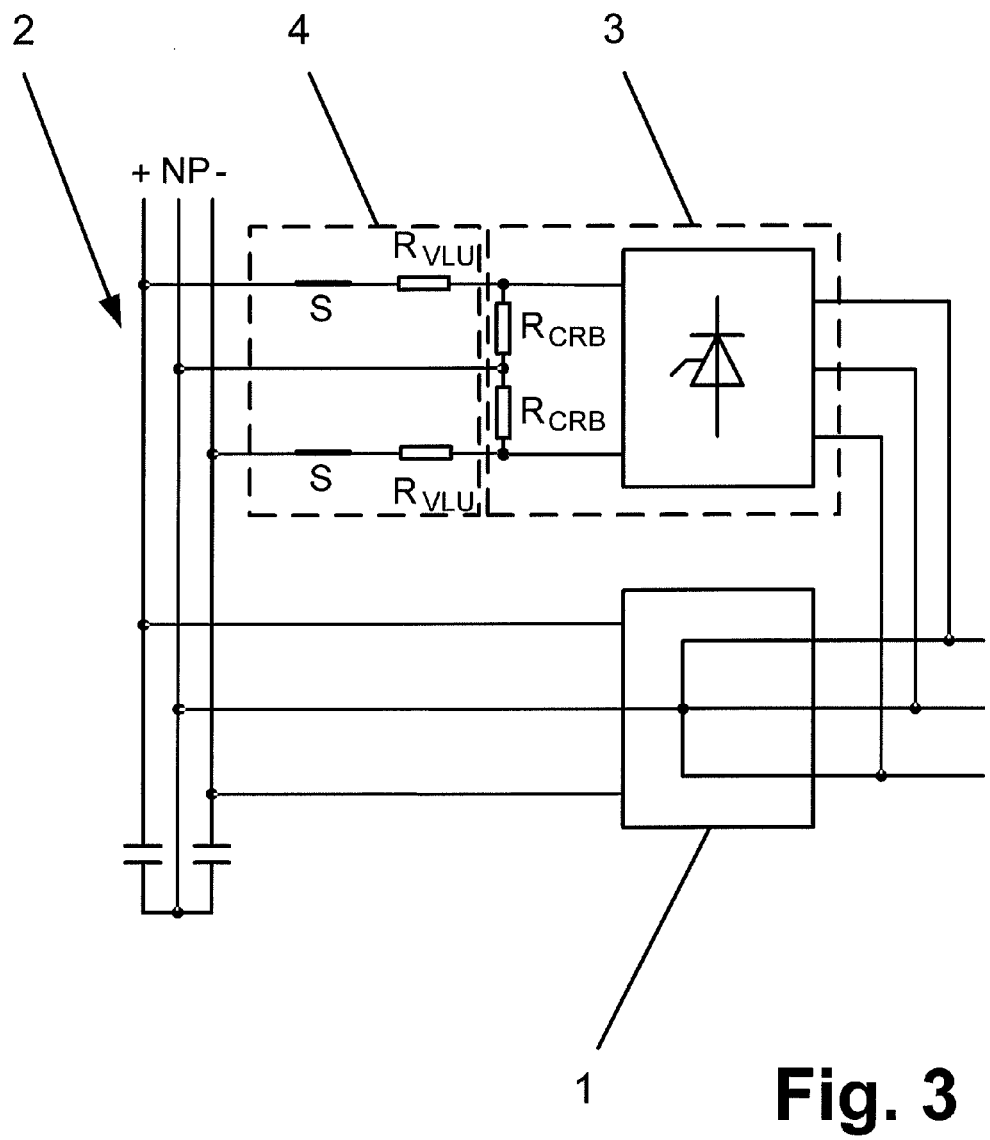
FIG. 3 shows the first form of embodiment of the converter system represented in FIG. 1 in a further operating state which is in accordance with an exemplary method according to the present disclosure for the operation of the converter system.

The method according to the present disclosure for the operation of the converter system for the switching of generally at least three voltage levels is described hereinafter with reference to FIGS. 1 to 3. In the converter system for the switching of at least three voltage levels, the shorting circuit 3, in addition to the plurality of thyristors, is also provided with at least two shorting resistors $R_{CRB}$. According to the method, the current flowing in the converter unit 1 is monitored in relation to a threshold value and, when this threshold value is exceeded, the thyristors in the shorting circuit 3 are then actuated by the application of a closing signal, such that the AC side of the converter unit 1 is connected to the at least two shorting resistors $R_{CRB}$. Accordingly, the at least two shorting resistors $R_{CRB}$ will then assume the take-up of current, until such time as the current falls back below the threshold value. According to an exemplary embodiment of the present disclosure, the voltage-limiting device 4 is connected to the at least two shorting resistors $R_{CRB}$ such that, when the threshold value is no longer exceeded, the converter unit 1 switches the AC side of the converter unit 1 to the voltage zero point NP of the DC circuit 2, as represented schematically in FIG. 2 for the example of a converter system for the switching of three voltage levels, and the closing signal for the thyristors in the shorting circuit 3 is no longer applied. The current flowing in the shorting resistors $R_{CRB}$, which now lies below the threshold value, is then advantageously switched to the converter unit 1, as the impedance of the converter unit 1 is lower than that of the shorting resistors RCRB. In addition, the voltage-limiting device 4 then connects the at least two shorting resistors $R_{CRB}$ to the DC circuit 2 for the configurable time interval, whereby each of the shorting resistors $R_{CRB}$ is connected to the DC circuit 2 via its respective limiting resistor $R_{VLU}$. In the case of a converter system for the switching of three voltage levels, as represented in FIG. 1, the controllable power switch S in the voltage-limiting device 4 for the connection of the two shorting resistors $R_{CRB}$ to the DC circuit 2 are closed for the configurable time interval, as represented schematically in FIG. 3 for the example of a converter system for the switching of three voltage levels. By the method according to the present disclosure, the voltage-limiting device 4 therefore functions, not for the purposes of voltage limitation or voltage reduction in response to an overvoltage on the DC circuit 2, but as a thyristor switch-off device, although it may also naturally be employed for the purposes of voltage limitation or voltage reduction. By the closing of the controllable power switches S on the voltage-limiting device 4 for the connection of the shorting resistors $R_{CRB}$ to the DC circuit 2, a back-e.m.f. is generated in the shorting resistors $R_{CRB}$, which advantageously affects the straightforward, rapid and reliable turn-off of the thyristors in the shorting circuit 3. Thereafter, the converter unit 1 isolates the AC side of the converter unit 1 from the voltage zero point NP of the DC circuit 2 once more thereby permitting the converter system to resume normal operation, by virtue of the converter unit 1, for example, again supplying an AC electricity system that may be connected on the AC side of the converter unit 1 and/or an electrical load.

In a converter system for the switching of two voltage levels, as represented in FIG. 5, by the method according to the present disclosure, the current flowing in the converter unit 1 is also monitored in relation to a threshold value and, when this threshold value is exceeded, the thyristors are actuated by the application of a closing signal, such that the AC side of the converter unit 1 is connected to the shorting resistor $R_{CRB}$. The shorting resistor $R_{CRB}$ assumes the take-up of current, until such time as the current falls back below the threshold value. According to an exemplary embodiment of the present disclosure, when the threshold value is no longer exceeded, the converter unit 1 switches the AC side of the converter unit 1 to the negative or positive voltage point of the DC circuit 2, and the closing signal is no longer applied to the thyristors. The current flowing in the shorting resistor $R_{CRB}$, which now lies below the threshold value, is then advantageously switched to the converter unit 1, as the impedance of the converter unit 1 is lower than that of the shorting resistor $R_{CRB}$. In addition, the voltage-limiting device 4 connects the shorting resistor $R_{CRB}$ to the DC circuit 2 for a configurable time interval, whereby the shorting resistor $R_{CRB}$ is connected to the DC circuit 2 via the limiting resistor $R_{VLU}$. The connection of the shorting resistor $R_{CRB}$ to the DC circuit 2 is affected by the closing of the controllable power switch S 2 for the configurable time interval. In accordance with an exemplary embodiment of the method according to the disclosure, the voltage-limiting device 4 therefore functions, not for the purposes of voltage limitation or voltage reduction in response to an overvoltage on the DC circuit 2, but as a thyristor switch-off device, although it may also naturally be employed for the purposes of voltage limitation or voltage reduction. By the closing of the controllable power switch S on the voltage-limiting device 4 for the connection of the shorting resistors $R_{CRB}$ to the DC circuit 2, a back-e.m.f. is generated in the shorting resistors $R_{CRB}$, which advantageously affects the straightforward, rapid and reliable turn-off of the thyristors in the shorting circuit 3. Thereafter, the converter unit 1 isolates the AC side of the converter unit 1 from the negative or positive voltage point of the DC circuit 2 once more, thereby permitting the converter system to resume normal operation by virtue of the converter unit 1, for example, will again supplying an AC electricity system that may be connected on the AC side of the converter unit 1 and/or an electrical load.

Overall, the method according to the disclosure for the operation of a converter system for the switching of at least three voltage levels and for the operation of a converter system for the switching of two voltage levels therefore permits the exceptionally problem-free, rapid and specifically secure turn-off of thyristors in the shorting circuit 3, thus permitting the exceptionally straightforward operation of the converter system.

If the applicable Grid Code, as mentioned above, provides terms whereby an electrical load in the form of a double-fed asynchronous machine is required to deliver a voltage-stabilization function on the electricity supply system at short notice, the immediate restoration of the normal automatic operation of the converter system, and specifically of the converter unit 1, is mandatory under certain circumstances. The converter system according to the present disclosure, and the method according to the present disclosure for the operation of a converter system for the switching of at least three voltage levels and for the operation of a converter system for the switching of two voltage levels, as described in detail above, therefore delivers a solution whereby the requisite operating performance of the converter system can be maintained during the normal operation thereof.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Converter unit
2 DC circuit
3 Shorting circuit
4 Voltage-limiting device
$R_{CRB}$ Shorting resistor
$R_{VLU}$ Limiting resistor
S Controllable power switch
NP Voltage zero point on the DC circuit

What is claimed is:

1. A converter system for the switching of least three voltage levels, the converter system comprising:
   a converter unit having a DC side and an AC side, the DC side of the converter unit being connected to a DC circuit having a voltage zero point, and the AC side of the converter unit is connected to a shorting circuit having a plurality of thyristors and at least two shorting resistors, wherein the converter unit is configured to monitor current carried by the converter unit in relation to a threshold value and, when the threshold value is exceeded, to actuate the thyristors by the application of a closing signal, such that the AC side of the converter unit is connected to the at least two shorting resistors; and
   a voltage-limiting device connected to the DC circuit and to the at least two shorting resistors, the voltage-limiting device being configured to restrict any overvoltage on the DC circuit and to turn-off the thyristors,
   wherein when the threshold value is no longer exceeded, the converter unit is configured to switch the AC side of the converter unit to the voltage zero point of the DC circuit and terminate application of the closing signal, and
   wherein the voltage-limiting device is configured to connect the at least two shorting resistors to the DC circuit for a configurable time interval, whereafter the converter unit is configured to isolate the AC side of the converter unit from the voltage zero point of the DC circuit once more.

2. The converter system as claimed in claim 1, wherein:
   the voltage-limiting device includes two series circuits each including a limiting resistor and a controllable power switch;
   wherein the shorting circuit includes two shorting resistors; and
   each series circuit including the limiting resistor the controllable power switch is connected to a corresponding one of the shorting resistors, respectively.

3. The converter system as claimed in claim 2, wherein the shorting resistors are interconnected.

4. A converter system for the switching of two voltage levels, the converter system comprising:
   a converter unit having a DC side and an AC side, the DC side of the converter unit being connected to a DC circuit, and the AC side of the converter unit being connected to a shorting circuit having a plurality of thyristors and a shorting resistor, wherein the converter unit is configured to monitor the current carried by the converter unit in relation to a threshold value and, when the threshold value is exceeded, to actuate the thyristors by the application of a closing signal, such that the AC side of the converter unit is connected to the shorting resistor; and a voltage-limiting device connected to the DC circuit and to the shorting resistor, the voltage-limiting device being configured to restrict overvoltage on the DC circuit and to turn-off of the thyristors, wherein, when the threshold value is no longer exceeded, the converter unit is configured to switch the AC side of the converter unit to a negative or positive voltage point of the DC circuit and terminate application of the closing signal, and wherein the voltage-limiting device is configured to connect the shorting resistor to the DC circuit for a configurable time interval, whereafter the converter unit is configured to isolate the AC side of the converter unit from the positive or negative voltage point of the DC circuit once more.

5. The converter system as claimed in claim 4, wherein:
the voltage-limiting device includes a series circuit including a limiting resistor and a controllable power switch; and
the series circuit including the limiting resistor and the controllable power switch is connected to the shorting resistor.

6. A method for the operation of a converter system for the switching of at least three voltage levels,
wherein the converter system includes a converter unit having a DC side and an AC side, the DC side of the converter unit being connected to a DC circuit having a voltage zero point, and the AC side of the converter unit is connected to a shorting circuit having a plurality of thyristors and at least two shorting resistors, the method comprising:
monitoring current carried by the converter unit in relation to a threshold value;
when the threshold value is exceeded, actuating the thyristors by the application of a closing signal, such that the AC side of the converter unit is connected to the at least two shorting resistors;
restricting, in a voltage-limiting device connected to the DC circuit and to the at least two shorting resistors, any overvoltage on the DC circuit;
switching in the converter unit the AC side of the converter unit to the voltage zero point, when the threshold value is no longer exceeded, and terminating application of the closing signal;
connecting, in the voltage-limiting device, the at least two shorting resistors to the DC circuit for a configurable time interval; and
after the configurable time interval, the converter unit isolates the AC side of the converter unit from the voltage zero point of the DC circuit once more.

7. The method as claimed in claim 6, wherein:
the voltage-limiting device includes two series circuits each including a limiting resistor and a controllable power switch;
the shorting circuit includes two shorting resistors;
each series including the limiting resistor and the controllable power switch is connected to a corresponding one of the shorting resistors, respectively;
the shorting resistors are interconnected; and
the controllable power switches on the voltage-limiting device for the connection of the two shorting resistors with the DC circuit are closed for the configurable time interval.

8. A method for the operation of a converter system for the switching of two voltage levels,
wherein the converter system includes a converter unit having a DC side and an AC side, the DC side of the converter unit being connected to a DC circuit, and the AC side of the converter unit being connected to a shorting circuit having a plurality of thyristors and a shorting resistor, the method comprising:
monitoring current carried by the converter unit in relation to a threshold value;
when the threshold value is exceeded, actuating the thyristors by the application of a closing signal, such that the AC side of the converter unit is connected to the shorting resistor;
restricting, in a voltage-limiting device connected to the DC circuit and to the shorting resistor, any overvoltage on the DC circuit;
switching, in the converter unit, the AC side of the converter unit to a negative or positive voltage point of the DC circuit, when the threshold value is no longer exceeded, and terminating application of the closing signal;
connecting, in the voltage-limiting device, the shorting resistor to the DC circuit for a configurable time interval; and
after the configurable time interval, the converter unit isolates the AC side of the converter unit from the negative or positive voltage point of the DC circuit once more.

9. The method as claimed in claim 8, wherein:
the voltage-limiting device includes a series circuit including a limiting resistor a controllable power switch;
the series circuit including the limiting resistor and the controllable power switch is connected to the shorting resistor; and
the controllable power switch on the voltage-limiting device for the connection of the shorting resistor to the DC circuit is closed for the configurable time interval.

* * * * *